United States Patent [19]

Herrmann

[11] Patent Number: 4,838,107
[45] Date of Patent: Jun. 13, 1989

[54] VIBRATION DAMPING ROTARY DRIVE ELEMENT

[75] Inventor: Gert Herrmann, Solingen, Fed. Rep. of Germany

[73] Assignee: Uni-Cardan Aktiengesellschaft

[21] Appl. No.: 116,392

[22] Filed: Nov. 3, 1987

[30] Foreign Application Priority Data

Nov. 3, 1986 [DE] Fed. Rep. of Germany ....... 3637383

[51] Int. Cl.⁴ .............................................. F16D 3/14
[52] U.S. Cl. ....................... 74/411; 74/445; 192/106.1; 192/106.2; 464/24
[58] Field of Search ............... 192/58 B, 70.17, 106.1, 192/106.2; 464/24; 74/411, 439, 445

[56] References Cited

U.S. PATENT DOCUMENTS

2,299,029 10/1942 Nutt ................................ 192/106.1
3,298,240 1/1967 McDowell et al. ................. 74/411
4,031,780 6/1977 Dolan et al. .......................... 74/711

FOREIGN PATENT DOCUMENTS

57-204320 12/1982 Japan ................................ 192/106.1
692954 6/1953 United Kingdom .................. 464/24

Primary Examiner—Rodney H. Bonck
Assistant Examiner—David A. Testardi
Attorney, Agent, or Firm—Toren, McGeady & Associates

[57] ABSTRACT

A rotary drive element for damping torsional vibration comprises an outer part (1) and an inner part (2) defining an annular space therebetween, containing a plurality of interleaved plates and a viscous fluid. The plates comprise a set of first plates (3) having internal teeth (6') which engage teeth (8) on the inner part (2) of the element substantially without circumferential clearance, and outer teeth (5) which engage teeth (7) in the outer part (1) with a circumferential clearance. The second set of plates has inner teeth which engage the teeth of the inner part with a circumferential clearance, and outer teeth which engage the teeth in the outer part (1) without a circumferential clearance. Thus the inner and outer parts are able to move angularly relative to one another according to the circumferential teeth clearances, which movement is damped by the viscous fluid between the plates. The drive element may be incorporated in a gear wheel for a vehicle transmission, or a clutch driven plate.

7 Claims, 4 Drawing Sheets

VIBRATION DAMPING ROTARY DRIVE ELEMENT

This invention relates to a rotary drive element which incorporates a coupling comprising a plurality of plates operating in a viscous fluid in order to provide for damping of vibrations.

Damping elements operating on the basis of viscous fluid friction are known, e.g. from DE-OS No. 3508237. In the arrangement disclosed therein a flywheel has an annular space which contains a viscous fluid and a rotatable annular mass. The ability of the annular mass to rotate relative to the flywheel in the viscous fluid provides the required damping. However, such an annular rotatable mass can only be disposed in an element such as a flywheel where there is sufficient space, because it has to be very large in order to achieve a sufficiently high fluid friction (actually the resistance to relative movement due to shear in the fluid between opposed surfaces of the flywheel and annular mass). Such a damping arrangement is not therefore suitable for general use.

It is the object of the present invention to provide a rotary drive element which makes use of viscous fluid friction to provide for vibration damping, but which is more compact than the flywheel above referred to.

According to the present invention I provide a rotary drive element comprising an inner part connectable to a shaft or other rotary element; an outer part axially unmovable but rotatably supported on the inner part, and connectable to a further rotary element; and an annular space defined between the inner part and the outer part and containing a viscous fluid and a plurality of plates having inner and outer circumferential teeth engaging teeth in the inner and outer parts for torque transmission therebetween, wherein the plates comprise a first set of plates whose inner teeth engage the teeth of the inner part substantially without circumferential clearance and whose outer teeth engage the teeth in the outer part with a circumferential clearance, and a second set of plates which alternate with the plates of the first set and whose outer circumferential teeth engage the teeth in the outer part substantially without circumferential clearance and whose inner teeth engage the teeth in the inner part with a circumferential clearance.

In a drive element according to the invention, the plurality of plates transmit torque between the inner and outer parts of the drive element. In the case of torsional vibrations, because of the circumferential clearances at the inner and outer teeth of the two sets of plates, the sets of plates and hence the inner and outer parts of the drive element can move circumferentially relative to one another which movement is damped by the presence of the viscous fluid, by shear of the fluid between the plates. Thus a high degree of damping is achieved in the smallest possible space.

As a large number of plates is provided, the plates in practice do not simultaneously take up their respective circumferential clearances in the relevant direction of rotation. Therefore, when there are torque fluctuations, an irritating clattering noise is not produced.

According to an advantageous feature of the invention, the plates, at least at their inner or outer circumferences, may be spaced from one another by spacer rings. The advantage of this is that the shear forces in the viscous fluid between the plates can be limited in their magnitude.

The drive element may take the form of a gear wheel, with gear teeth provided on the outer part of the drive element. This permits the vibration damping drive element to be used in transmissions without there being any need for additional space and without having to redesign the transmission at great expense.

The drive element may be used as a coupling gear between a main transmission shaft and an auxiliary transmission shaft in a vehicle transmission. With the help of this design, engine-induced vibrations are isolated at the input end of the transmission.

In a further embodiment of the invention, the drive element can be incorporated in a clutch driven plate for a vehicle. In this case, the circumferential clearance provided in the plates in the viscous fluid has to be able to accommodate the circumferential movement possible in the clutch plate.

The invention will now be described by way of example with reference to the accompanying drawings, of which:

Figure 2:
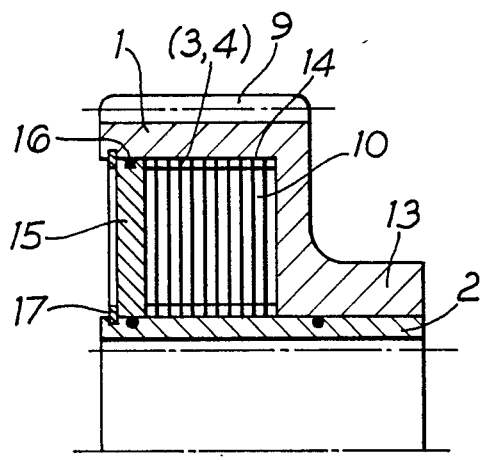
FIG. 2 is a longitudinal section through the drive element.

Referring firstly to FIG. 2, the drive element there shown comprises an inner part 2 which is in the form of a hub with a splined bore, intended to be fitted on a shaft. The element further comprises an outer part 1, having a cylindrical projection 13 which is rotatably supported on the inner part 2, and an expanded sleeve part 14 which defines an annular space between it and the inner part 2. The outer part 1 has external teeth 9 for driving connection with a gear wheel. The annular space defined between the inner and outer parts 2, 1 contains a coupling assembly 10 comprising a plurality of plates 3, 4 and a viscous fluid, retained by a cover 15 with O-ring seals 16. A retaining element 17 holds the cover 15 in place and prevents relative axial movement between the inner and outer parts 2, 1.

Figure 1:
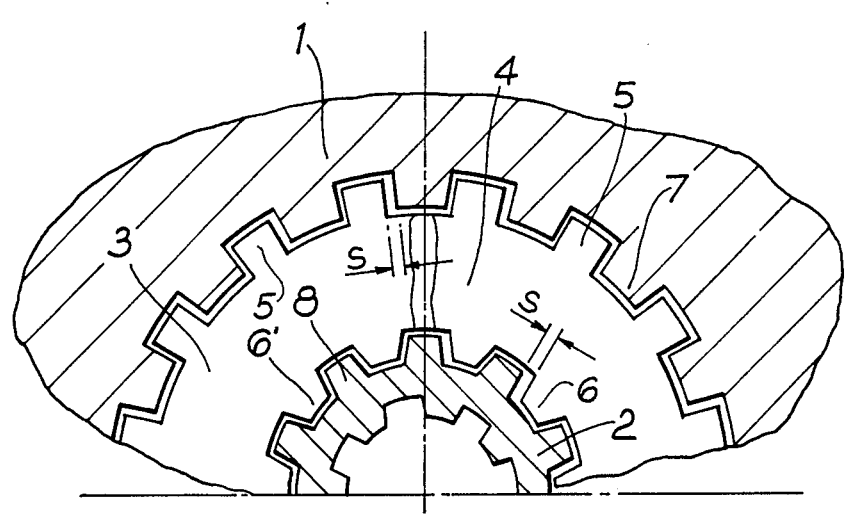
FIG. 1 is a cross-section through part of a drive element according to the invention.
Figure 4:
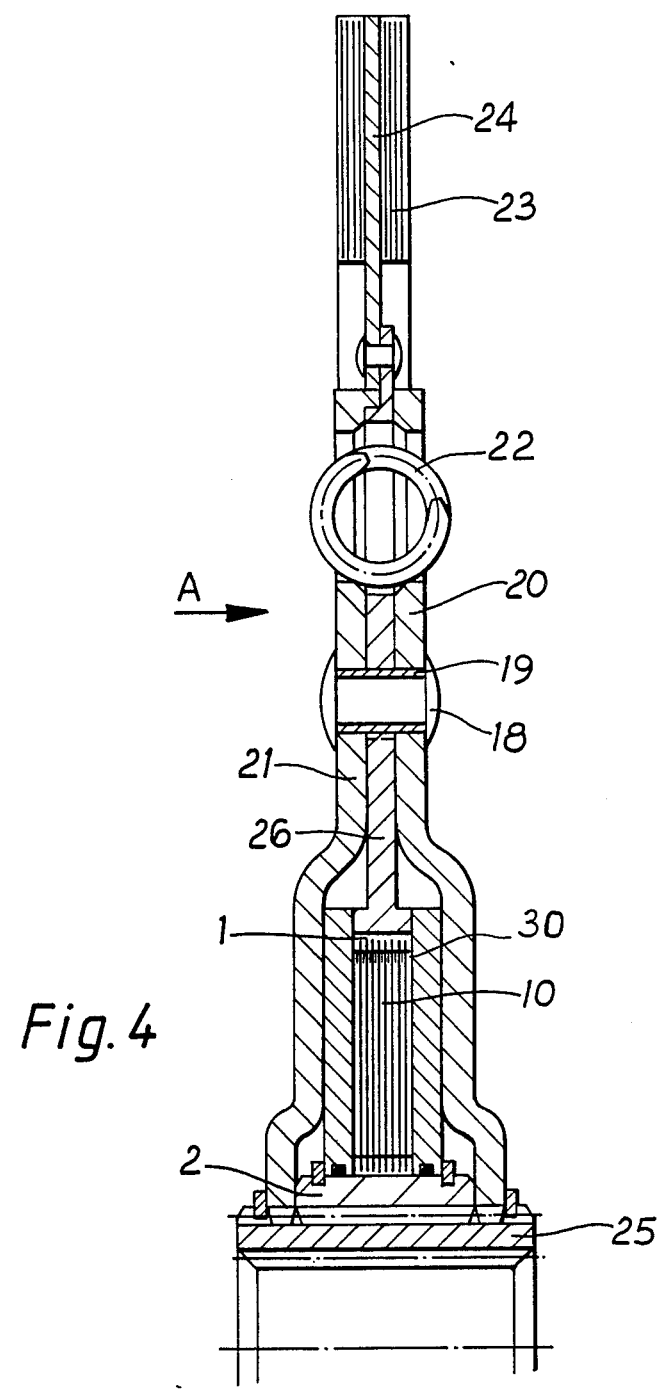
FIG. 4 is a section through a clutch driven plate incorporating the invention.

With reference more particularly now to FIG. 1, the plates 3, 4 are of annular form having inner and outer circumferentially disposed teeth which engage teeth provided in the outer and inner parts of the drive element. Plate 3 has inner teeth 6' and outer teeth 5, while plate 4 has inner teeth 6 and outer teeth 5'. The outer part 1 of the drive element has internal teeth 7, and the inner part 2 has external teeth 8. Spacer rings may be disposed between the plates at the inner and/or outer circumference thereof. In FIG. 4, spacer rings 30 are shown adjacent the outer circumferences of the plates 3,4.

The plates comprise a first set of plates 3 which alternate with the plates 4 of a second set of plates. Each of the plates 3, as shown in the left-hand half of FIG. 1, has internal teeth 6' which engage substantially without circumferential clearance with the teeth 8 of the inner part 2, and external teeth 5 which engage with the teeth 7 of the outer part 1 with a circumferential clearance S.

Each of the plates 4 of the second set of plates has external teeth 5' which engage with the teeth 7 of the outer part 1 substantially without circumferential clearance, and internal teeth 6 which engage the teeth 8 of the inner part 2 with a circumferential clearance S.

Thus the plates 3 of the first set thereof are able to move relative to the plates 4 of the second set of plates by a circumferential distance S. The outer part 1 of the coupling element is able to move angularly relative to the inner part 2, to the extent of the distance S. Such movement is damped by the viscous fluid surrounding the plates, since such movement causes shear in the fluid. The drive element thus damps torsional vibrations.

Figure 3:
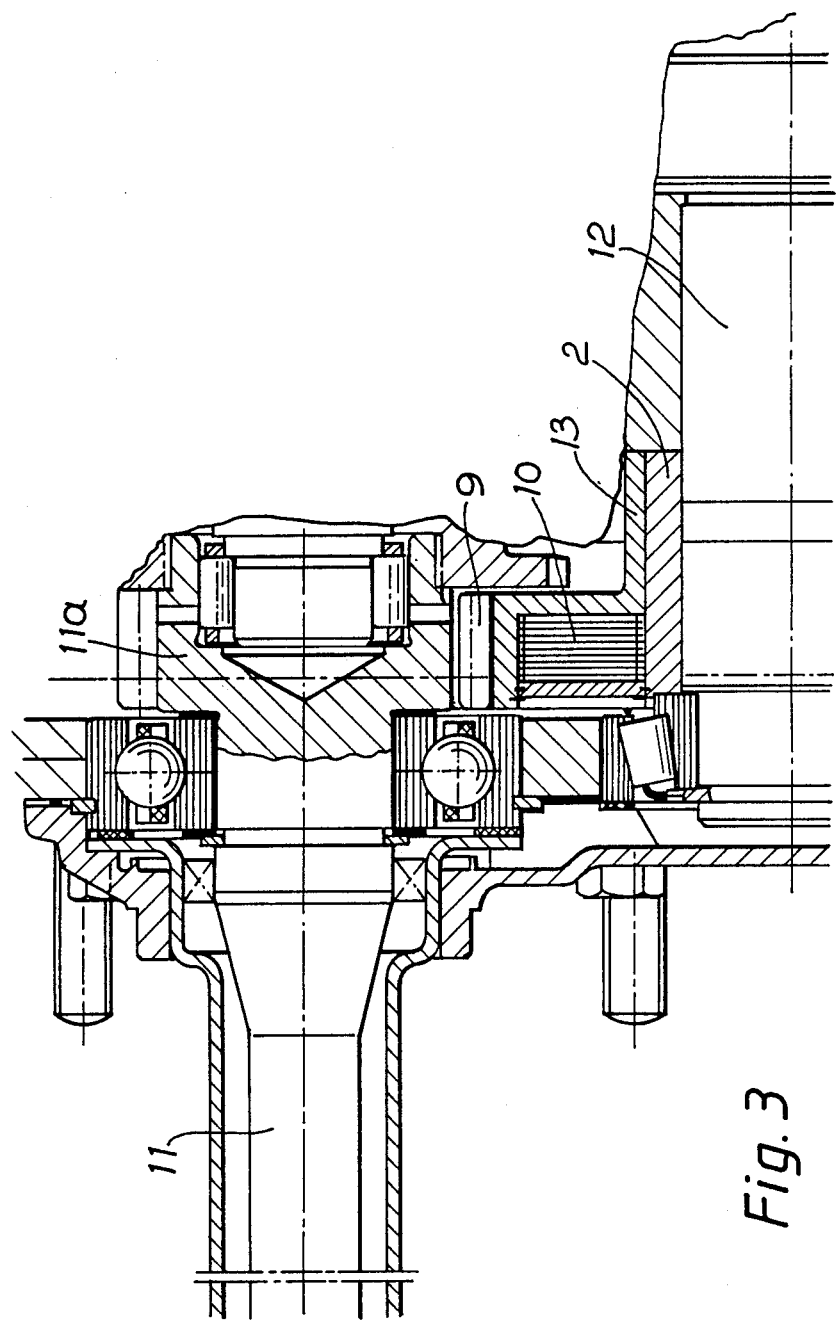
FIG. 3 shows diagrammatically part of a transmission incorporating the drive element.

FIG. 3 shows diagrammatically how a drive element as above described may be incorporated in a motor vehicle transmission. The drive element is shown with its inner part 2 engaged with an auxiliary transmission shaft 12, and its teeth 9 on its outer part engaging corresponding teeth provided on a gear 11a of a main transmission shaft 11. The damping effect of the drive element prevents any engine-induced torsional vibrations from being introduced into the drive line from the shaft 12.

Referring now to FIG. 4, there is shown how a vibration damping rotary drive element according to the invention can be incorporated in a clutch driven plate. The illustrated driven plate comprises a hub 25 which is internally splined to engage a clutch shaft and also is externally splined. The external splines on the hub 25 engage the inner part 2 of a drive element analogous to that of FIGS. 1 and 2, the drive element further comprising an outer part 1 providing an annular space containing a coupling 10 as above described, having plates and a viscous fluid. The outer part 1 has an outwardly extending flange 26 at whose external periphery is riveted an annular carrier 24 having friction linings 23. The flange 26 lies between side plates 20, 21 which extend radially inwardly to engage the exterior splines on the hub 25. The side plates 20, 21, and the flange 26 have, in the manner generally known for clutch plates, circumferentially spaced recesses in which are received respective circumferentially extending coil springs 22 which resiliently resist angular movement between the side plates and the flange 26.

When relative angular movement occurs between the side plates and the flange 26, resisted by springs 22 in known manner, such angular movement causes relative angular movement between the two sets of plates in the coupling 10. Such angular movement is damped by the viscous fluid, as above described.

The amount of angular movement possible in the clutch plate may be limited by the circumferential clearances in the teeth of the sets of plates in the drive element 1, 2, 10 incorporated in the clutch plate. However, it may be limited by stop means such as a rivet 18 connecting the side plates 20, 21. Rivet 18 passes through a spacer sleeve 19 so that the side plates are not deformed into frictional engagement with the flange 26. Where the sleeve 19 passes through the flange 26, the flange has a circumferentially elongated aperture 27, with the extent of relative movement possible between the side plates and the flange being limited by the circumferential extent of aperture 27. It will be appreciated that a number of rivets and spacer sleeves 18, 19 would be provided circumferentially spaced about the clutch plate.

Figure 5:
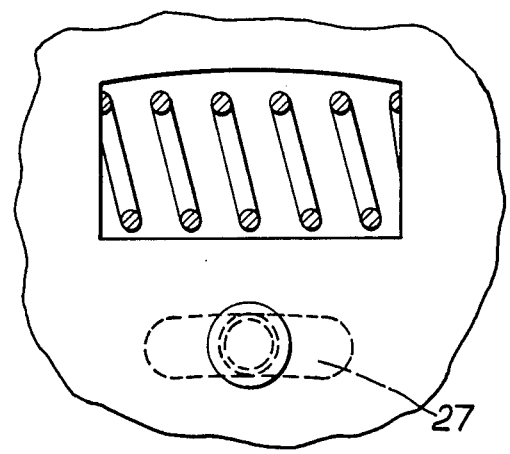
FIG. 5 is a partial view in the direction of arrow A of FIG. 4.
Figure 6:
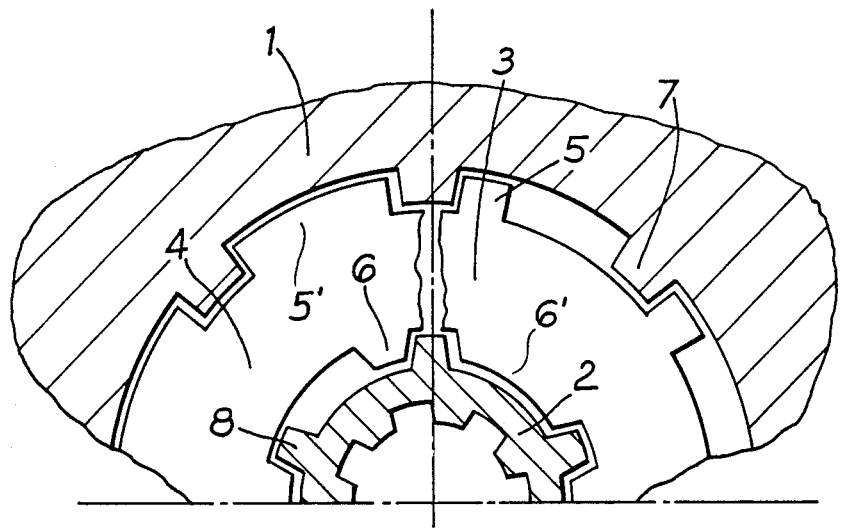
FIG. 6 is a cross section through part of the driven plate.

FIG. 6 shows how the plates 3, 4 would be arranged in the damping drive element incorporated in the clutch plate of FIGS. 4 and 5. The same reference numerals are used as in FIG. 1, for the plates 3, 4 of the first and second sets thereof, and their external and internal teeth engaging with the teeth in the outer and inner parts 1, 2. In this case, it will be noted that the circumferential clearances at the inner teeth 6 of plates 4, and outer teeth 5 of plates 3 are such as not to constrict relative angular movement between the flange 26 and side plates 20, 21, within the restriction of such movement provided by the arrangement of rivet 18.

It would, alternatively as above referred to, be possible to limit the angular movement possible in the clutch plate by the arrangement of plates 3, 4 and the clearances provided at the teeth thereof. In this case, the dimensions of apertures as 27 in the flange 26 would be correspondingly greater such that they do not provide any restriction on angular movement in the clutch plate.

I claim:

1. A rotary drive element comprising an axially extending inner part connectable to a shaft or other rotary element; an axially extending outer part coaxial with said inner part and axially unmovable but rotatably supported on the inner part and connectable to a further rotary element; and an annular space defined between the inner part and the outer part and containing a viscous fluid and a plurality of annular plates extending transversely of the axis of said inner and outer parts and having radially inner and outer circumferentially extending teeth engaging circumferentially extending teeth in the inner and outer parts for the torque transmission therebetween, wherein the plates comprise a first set of plates whose inner teeth engage the teeth in the inner part substantially without circumferential clearance and whose outer teeth engage the teeth in the outer part with a circumferential clearance, and a second set of plates which alternate with the plates of the first set and whose outer circumferential teeth engage the teeth in the outer part substantially without circumferential clearance and whose inner teeth engage the teeth in the inner part with a circumferential clearance so that the inner and outer parts can move angularly relative to one another and such movement is damped by the viscous fluid between the plates.

2. A drive element according to claim 1 further comprising spacer rings disposed between adjoining plate adjacent at least one of the internal and external circumferences thereof.

3. A drive element according to claim 1 in the form of a gear wheel, having gear teeth provided on the outer part thereof.

4. A motor vehicle transmission including a main transmission shaft, an auxiliary transmission shaft, and a drive element according to claim 3 connecting the main and auxiliary shafts.

5. A clutch plate for a motor vehicle, including clutch parts movable angularly relative to one another and a drive element according to claim 1 operatively connected between said parts to damp said relative angular movement therebetween.

6. A clutch plate according to claim 5 wherein the extent of said relative angular movement is limited by the circumferential clearances at the teeth of the first and second sets of plates of the drive element.

7. A clutch plate according to claim 5 comprising stop means extending between one of said clutch parts and one of said inner and outer parts of said drive element, for limiting the extent of said angular movement.

* * * * *